March 17, 1959 P. C. GOLDMARK 2,878,307

APERTURE DISTORTION CORRECTING SYSTEM

Filed May 4, 1954

INVENTOR.
PETER C. GOLDMARK
BY
Campbell, Brumbaugh, Free & Graves
ATTORNEYS

United States Patent Office 2,878,307
Patented Mar. 17, 1959

2,878,307

APERTURE DISTORTION CORRECTING SYSTEM

Peter C. Goldmark, New York, N. Y., assignor to Columbia Broadcasting System, Inc., New York, N. Y., a corporation of New York Application May 4, 1954, Serial No. 427,525

7 Claims. (Cl. 178—5.2)

Figure 1:
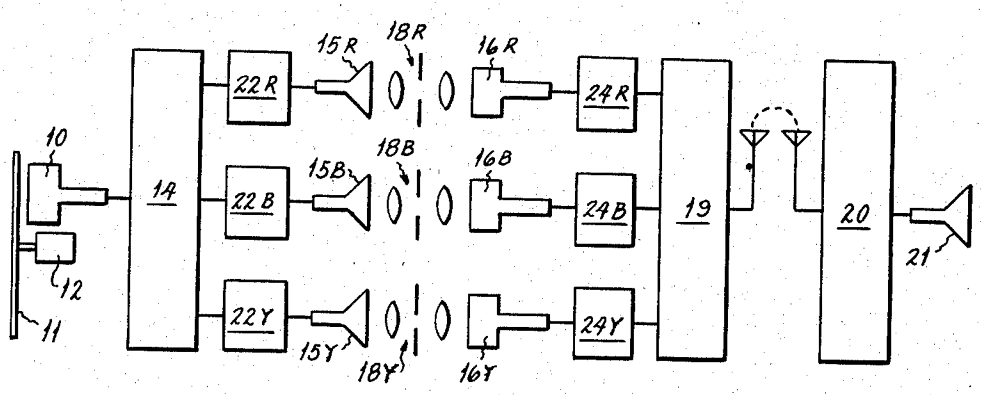

The present invention relates to television, and more particularly, to a novel and improved tandem television system utilizing multiple scansions in different directions of scan which embodies means for correcting aperture distortion arising as a result of the fact that the scanning beams employed are of finite size.

The problem of aperture distortion has long been recognized in television systems and the like in which elemental areas of an image are scanned successively. It manifests itself as an effective reduction in the horizontal and vertical resolution of the image produced by these systems. This reduction in resolution is caused by the finite size of the transmitting scanning spot and is most apparent in the scanning of areas wherein sharp brightness contrasts are present.

For example, if an element of the picture which is being scanned is black and is positioned in a white zone, it will be apparent that the periphery of the black element is defined by a sharp contrast line. Theoretically, if the transmitting scanning spot were infinitely small (i. e., lacking in finite length and width), in moving across the white zone towards the black element it would produce a video signal representative of white until it reached the boundary between the white zone and the black element. When it crossed the boundary, the signal would instantly change from one representative of white to one representative of black.

In practice, however, an infinitely small scanning spot cannot be achieved, and practical considerations dictate that a scanning spot of finite size be employed. When a scanning spot of this character moves across the white zone toward the black element, a signal representative of white is produced until the edge of the spot begins to move across the black element. At that time, the scanning spot is exposed to both black and white, and a signal representative of a shade of grey is produced. It will be apparent that as the scanning spot continues to move towards and onto the black element, the proportion of black and white to which the scanning spot is exposed will vary. Accordingly, the signal produced in response to the exposure of the scanning spot, instead of changing from white to black at the periphery of the black element, will go from white through ever darkening shades of grey to black, thereby impairing the picture detail.

The invention is of particular utility in tandem television systems of the type disclosed in the applicant's copending application Serial No. 375,219, filed August 19, 1953, for "Color Television." In a system of this general character, color separations of an object to be televised are scanned in a field sequential manner by uniform linear scanning. From the signals produced as a result of the scanning operations, monochrome images corresponding to the respective color separations are produced on the faces of a plurality of picture tubes. Each of these images is scanned by uniform linear scanning in a direction substantially perpendicular to the direction of scan in the initial scanning operations and the signals thus produced are combined as required for transmission to a suitable terminal device such as a color receiver, for example.

It is an object of the invention to provide novel aperture distortion correction means for tandem television systems of the above character and the like in which correction is made for aperture distortion both along the initial line of scan and substantially perpendicular thereto.

In accordance with the invention, first aperture distortion correction means for emphasizing the response at the upper end of the frequency band is interposed between the first camera tube and each of the picture tubes receiving signals therefrom so as to restore detail lost by aperture distortion along the scanning line of the first camera tube. Also, the outputs of the second camera tubes which scan the images formed on the first picture tubes, respectively, are fed to a plurality of second aperture distortion correction means for emphasizing the response at the upper end of the frequency band so as to restore detail lost by aperture distortion along the line of scan of the second camera tubes, which is substantially perpendicular to the line of scan of the first picture tube. As a result, the signal outputs of the second camera tubes incorporate correction for aperture distortion in the direction of scan of the first camera tube and in a direction substantially perpendicular thereto.

Figure 2:
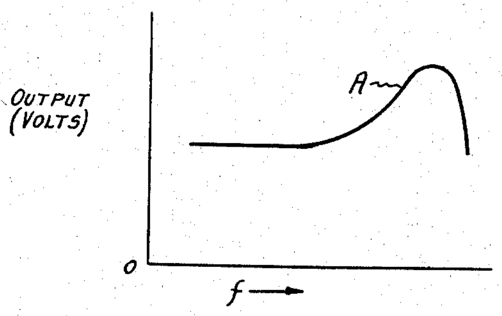

For a more complete understanding of the invention, reference may be had to the following detailed description taken in conjunction with the accompanying figures of the drawing, in which:

Fig. 1 is a block diagram showing an exemplary television system, wherein aperture distortion is corrected, in accordance with the invention; and Fig. 2 is a graphical representation of a typical frequency response curve for the aperture correction means of the invention.

Referring now to Fig. 1, which shows schematically a color television system of the type disclosed in the aforementioned application Serial No. 375,219, a camera tube such as an image orthicon 10 is adapted to scan an object through a color sectored disc 11. The disc 11 is adapted to be driven by a suitable driving means 12 in synchronism with the field scanning operation of the image orthicon 10 in a field sequential system with uniform linear scanning, e. g., 180 fields per second. The video signal produced by the image orthicon 10 is fed through suitable control circuits 14 into three separate channels having picture tubes or kinescopes 15R, 15B and 15Y, respectively, synchronized with the image orthicon 10 for uniform linear scanning. A monochromatic image is produced on the screen of the kinescope 15R representative of the red information in the object scanned by the image orthicon 10. Similarly, a monochromatic image on the screen of the kinescope 15B is representative of the blue information, and a monochromatic image on the screen of the kinescope 15Y is representative of the white or brightness information.

In juxtaposition to the kinescopes 15R, 15B and 15Y, corresponding image orthicons 16R, 16B and 16Y are arranged so as to scan simultaneously the images on the screens of the kinescopes 15R, 15B and 15Y through the optical systems 18R, 18B and 18Y, respectively. In the applicant's aforementioned copending application, the scanning rate for the image orthicons 16R, 16B and 16Y may be 60 fields per second. In order to eliminate moire effects, the kinescopes 15R, 15B and 15Y operate with vertical uniform linear scanning patterns, whereas in the image orthicons 16R, 16B and 16Y the scanning lines extend in a perpendicular or horizontal direction.

The video signals respectively produced by the image orthicons 16R, 16B and 16Y are fed through their respective channels to the transmitter control circuits 19. A composite color video signal is then developed in the transmitter control circuits 19 and is transmitted via radio or other suitable media to receiver control circuits 20, which control the operation of a color picture tube 21.

Since the scanning direction for the three channels feeding the kinescopes 15R, 15B and 15Y is vertical, aperture distortion resulting from the finite dimensions of the scanning beam in the image orthicon 10 causes a reduction in the vertical resolution of the images on the screens of the kinescopes 15R, 15B and 15Y. In order to correct for this aperture distortion, individual aperture distortion correction means 22R, 22B and 22Y may be respectively placed in the channels associated with the kinescopes 15R, 15B and 15Y. These may be wide band amplifiers having gain frequency characteristics illustrated by the curve A in Fig. 2 in which the gain rises with frequency, the rise being sufficient to restore the detail lost by aperture distortion along the line of scan. Alternatively, they may be filter networks having suitable amplitude frequency characteristics for the purpose, as disclosed in Patent No. 2,273,163, for example.

In order to correct or compensate for aperture distortion along the lines of scan of the tubes 16R, 16B and 16Y, aperture correction means 24R, 24B and 24Y are inserted between the image orthicons 16R, 16B and 16Y, respectively, and the transmitter control circuits 19. The aperture correction means 24R, 24B and 24Y may again consist of wide band amplifying means similar to the aperture correction means 22R, 22B and 22Y and having frequency responses such as shown by the curve A in Fig. 2, in which the higher frequency harmonics are emphasized so as to sharpen the horizontal resolution of the picture signal.

Thus there has been provided, in accordance with the invention, novel and improved means for correcting or compensating for aperture distortion in tandem picture reproducing systems utilizing multiple scansions in different directions with scanning apertures or beams of finite size. By providing aperture distortion compensating means in each of a plurality of video links in tandem and adapted for uniform linear scanning in angularly spaced apart directions, compensation may be made for degradation of horizontal and vertical resolution attributable to aperture distortion. As a result, the overall resolution of the system is appreciably improved.

It will be understood by those skilled in the art that the above-disclosed embodiment is meant to be merely exemplary. The application of the principles of the invention may be utilized in many diverse types of systems, including the several embodiments disclosed in the aforementioned application Serial No. 375,219, without departing from the spirit and scope of the invention. For example, the invention is equally applicable to a single channel television system having two or more tandem video links. Further, in some cases it may be sufficient in the embodiment shown in Fig. 1 to provide aperture distortion correction means 24Y only in the Y channel which largely determines the detail in the final picture. Also, the invention may be utilized in systems other than television systems, such as multiple link tandem facsimile systems. Therefore, the specific example disclosed herein should not be considered to limit the scope of the appended claims.

I claim:

1. In a system for transmitting visual information, the combination of a plurality of tandem links, each link having means for uniform linear scanning of a visual object to produce an electrical signal and means utilizing uniform linear scanning for producing a visual image of the scanned object under the control of the electrical signal, the scanning directions in two adjacent links being mutually angularly displaced, and means in each of said links for correcting aperture distortion in the respective scanning directions thereof.

2. In a television system, the combination of at least two tandem video links, each having camera tube means and picture tube means adapted for uniform linear scanning, the scanning directions in said two links being mutually angularly displaced, means in one of said video links for correcting aperture distortion therein in the direction of scanning in said one link, and means in the other of said video links for correcting aperture distortion therein in the different scanning direction in said another video link.

3. In a television system, the combination of at least two tandem video links, each including camera tube means for uniform linear scanning of a visual object to produce a video signal and picture tube means utilizing uniform linear scanning for producing a visual image in response to said video signal, the scanning directions in each of said links being mutually angularly displaced, means in a first one of said video links for emphasizing the high frequency response in said link so as to correct for aperture distortion therein in the scanning direction thereof, and means for emphasizing the high frequency response in the second of said links so as to correct for aperture distortion therein in the scanning direction thereof.

4. A television system such as described in claim 3, wherein the directions of scanning in adjacent ones of said tandem video links are mutually perpendicular.

5. In a color television system, the combination of first scanning means including picture tube means for uniform linear scanning of color separations of an object in a sequential manner to produce a plurality of video signals representative of said respective color separations, a plurality of channels connected to receive said video signals sequentially, image producing means utilizing uniform linear scanning in each of said channels for producing corresponding visual images under the control of the respective video signals therein, a plurality of second scanning means including picture tube means for uniform linear scanning of said respective images for producing second video signals representative thereof, the scanning directions in said each of said second scanning means being mutually angularly displaced with respect to the scanning directions in the corresponding image producing means, means for combining said second video signals, means interposed between said first scanning means and the image producing means in at least one of said channels for correcting aperture distortion in the scanning direction thereof, and means interposed between the second scanning means corresponding to said last-named image producing means and said signal combining means for correcting aperture distortion in the direction of scanning of said second scanning means.

6. A color television system such as described in claim 5, wherein the scanning directions in each of said second scanning means are perpendicular with respect to the scanning directions in the corresponding image producing means.

7. A color television system such as described in claim 5 in which aperture distortion correction means are interposed between said first scanning means and each of said image producing means, and between each of said second scanning means and said signal combining means, and the scanning directions in each of said second scanning means are perpendicular with respect to the scanning directions in the corresponding image producing means.

References Cited in the file of this patent

UNITED STATES PATENTS

| | | |
|---|---|---|
| 2,292,166 | Singer | Aug. 4, 1942 |
| 2,568,543 | Goldsmith | Sept. 18, 1951 |
| 2,587,074 | Sziklai | Feb. 26, 1952 |
| 2,607,845 | Clark | Aug. 19, 1952 |
| 2,651,673 | Fredendall | Sept. 8, 1953 |
| 2,657,257 | Lesti | Oct. 27, 1953 |
| 2,717,276 | Schroeder | Sept. 6, 1955 |
| 2,736,766 | Fredendall | Feb. 28, 1956 |
| 2,748,189 | Bedford | May 29, 1956 |